United States Patent [19]

Delio

[11] Patent Number: 5,170,358
[45] Date of Patent: Dec. 8, 1992

[54] METHOD OF CONTROLLING CHATTER IN A MACHINE TOOL

[75] Inventor: Thomas S. Delio, Gainesville, Fla.

[73] Assignee: Manufacturing Laboratories, Inc., Gainesville, Fla.

[21] Appl. No.: 623,055

[22] Filed: Dec. 6, 1990

[51] Int. Cl.[5] .................... G06F 15/46; G08B 21/00
[52] U.S. Cl. ............................. 364/474.19; 364/508;
364/551.02; 73/104; 340/680; 340/683
[58] Field of Search ................. 340/680, 683; 73/104;
318/571; 364/474.15, 474.16, 474.17, 474.19,
474.22, 474.27, 474.3, 474.34, 474.35, 507, 508,
550, 551.02

[56] References Cited

U.S. PATENT DOCUMENTS

| | | | |
|---|---|---|---|
| 4,080,853 | 3/1978 | Goto | 82/2 R |
| 4,456,960 | 6/1984 | Wakai | 364/474.17 |
| 4,558,311 | 12/1985 | Forsgren et al. | 340/680 |
| 4,559,600 | 12/1985 | Rao | 364/474.17 |
| 4,604,834 | 8/1986 | Thompson | 364/474.06 |
| 4,617,503 | 10/1986 | Davis et al. | 364/474.34 |
| 4,636,780 | 1/1987 | Thomas et al. | 340/680 |
| 4,698,773 | 10/1987 | Jeppsson | 364/474 |
| 4,723,219 | 2/1988 | Beyer et al. | 364/474 |
| 4,806,914 | 2/1989 | Thomas et al. | 340/680 |
| 4,833,617 | 5/1989 | Wang | 364/474.17 |
| 4,849,741 | 7/1989 | Thomas | 340/683 |
| 4,853,680 | 8/1989 | Thomas | 340/680 |

OTHER PUBLICATIONS

"Adaptive Control for Face-Milling Operations with Strategies for Avoiding Chatter-Vibrations and for Automatic Cut Distribution", by Weck, Verhaag & Gather.
"A Sound Monitoring System for Fault Detection of Machine and Machining States", by Takata, Ahn, Miki, Miyao & Sata from the Annals of the CIRP, vol. 35/1/86.
"Sensor-Based Control for Chatter-Free Milling by Spindle Speed Selection", by Smith & Delio.

Primary Examiner—Jerry Smith
Assistant Examiner—Thomas E. Brown
Attorney, Agent, or Firm—Pettis & McDonald

[57] ABSTRACT

A method of controlling chatter in a rotating, chip cutting machine tool cutting at a predetermined depth on a workpiece in which the speed of rotation of the cutting tool relative to the workpiece and the rate of speed of the cutting tool relative to the workpiece both adjustably controlled between predetermined minimum and maximum rates for the particular combination of machine tool and workpiece material. The method includes the steps of detecting vibration signals representative of relative vibrations between the machine tool and the workpiece and generated by preliminary operation of the machine tool at predetermined conditions, processing that generated signal as a function of signal frequency, obtaining a signal indicative of the rotational speed and determinating the threshold of the signal level above which are excluded harmonics of the predetermined rotational frequencies that are indicative of chatter in the cutting tool. Additional steps interrupt the feed of the cutting tool and change the speed of rotation if operationally generated audio signal levels exceed a threshold and then change the speed of rotation of the cutting tool and resume the feed of cutting engagement. These steps are repeated until operation of the machine tool is obtained without operationally generated chatter signals exceeding the threshold or, when necessary, reducing the speed of rotation and the rate of feed to predetermined levels known to avoid generation of chatter signals in excess of the threshold.

13 Claims, 7 Drawing Sheets

METHOD OF CONTROLLING CHATTER IN A MACHINE TOOL

FIELD OF THE INVENTION

This invention relates to a method for detecting and controlling chatter or unstable vibrations during cutting operations with a machine tool. More particularly, it relates to such a method for use with a chip cutting machine tool in which the speed of rotation of the cutting tool relative to the workpiece and the rate of feed of the cutting relative to the workpiece are both adjustably controllable. This invention provides a method to recognize unstable chip removal by the machine tool from the workpiece and a procedure for possible stabilization of the chip removal through discrete changes in the speed of rotation of the cutting tool relative t the workpiece.

BACKGROUND OF THE INVENTION

Chatter or instability in machining operations, such as turning, boring, milling and the like, is a common problem in industry. Production time, which is related in large part to the rate of metal removal in machining, is usually restricted by the dynamic characteristics of the machine tool and the workpiece, and these characteristics can vary depending upon the operating conditions of the machine tool, such as rotational speed, feed rate, temperature and others, and by geometry of the workpiece and the relative orientation and velocity of the chip removal tools relative to the workpiece. These dynamic characteristics, in turn, limit the stability of the machine tool and, hence, restrict its production capacity. Further, such instability may cause tool failure, with potentially serious damage to the workpiece, and may significantly reduce production rates due to necessary time needed for corrective action.

When seeking to control this chatter or instability, it has been found that it is not always possible to eliminate fully the instability by properly designing the machine tool. The geometry of the workpiece may dictate elements of the machine tool configuration that promote instability. Additionally, the workpiece may, by its very nature, be a source of instability in a given machining process.

Over the years several techniques to reduce chatter have been attempted. However, such prior art efforts have generally been unsatisfactory for a variety of reasons. One prior art technique for chatter elimination was published by Weck and Gather but was restricted to face milling operations and required extensive prior knowledge of the dynamic characteristics of the machine tool, which characteristics must then be quantified or measured prior to the use of the machine tool. Other systems described by Takemura and Hoshi have addressed the problem of chatter by periodically varying speed of rotation. However, this technique of continuous periodic speed variation requires substantial modifications to the machine tool drive and was limited, in any event, to lathe operations.

SUMMARY OF THE INVENTION

In order to overcome the various limitations of prior art techniques, it is an object of the present invention to provide a method of controlling chatter that may be applied to a variety of machining operations. It is another object to provide such a method that may be implemented with relatively little modification of machinery control and drive. It is yet another object of the present invention to provide such a method of controlling chatter that may be utilized with little or no prior knowledge of the dynamic characteristics of the machine tool or workpiece. To achieve these and other objects, which will become apparent to those skilled in the art, the present invention comprises a method of controlling chatter in a chip cutting machine tool cutting at a predetermined depth on a workpiece and in which the speed of rotation of the cutting tool relative to the workpiece and the rate of feed of the cutting tool relative to the workpiece are both adjustably controllable between predetermined minimum and maximum rates for the particular combination of machine tool and workpiece material. This method includes the steps of using a vibration sensor to detect signal levels representative of relative vibrations between the machine tool and the workpiece and generated by preliminary operation of the machine tool under predetermined conditions of cutting depth, rotational speed and rate of feed, processing the generated signals to obtain measurements of the signal levels generated by the preliminary operation as a function of signal frequency, obtaining a signal indicative of the rotational speed during that preliminary operation and determining the rotational frequency therefrom, and determining a threshold of the signal levels such that the signal levels above that threshold for predetermined frequencies that exclude harmonics of the predetermined rotational frequency are indicative of chatter vibrations between the cutting tool and workpiece, and operating the machine tool at a predetermined speed of rotation and a predetermined feed rate with respect to the workpiece and detecting the signal levels operationally generated by operational cutting engagement between the cutting tool and the workpiece. In this method, if the operationally generated signal levels exceed the threshold, then are implemented the steps of interrupting the feed of the cutting tool relative to the workpiece, changing the speed of rotation to an adjusted speed of rotation, so that the rotational frequency becomes generally equal to one of a predetermined set of subharmonics of the frequency of the highest generated chatter signal level, unless that speed of rotation is found to be substantially below the maximum rotational speed in which case said speed of rotation is changed to said maximum rate of speed of rotation, and then resuming the feed and cutting tool engagement with the workpiece and operating the machine tool at that adjusted speed of rotation. In this method the steps of operating the machine tool and then taking the defined steps if the operationally generated chatter signal levels exceed the threshold are repeated until operation of the machine tool is obtained without any chatter signal levels exceeding that threshold, up to a predetermined maximum number of such repetitions. If the operationally generated chatter signal levels exceed the threshold after the predetermined maximum number of repetitions has been made, then the speed of rotation and rate of feed are reduced to predetermined maximum levels known to avoid the generation of the chatter signal levels in excess of the threshold, whereby chatter free cutting of the workpiece is sought at cutting rates greater than the speed known to avoid chatter, but with reduction to that known speed if higher cutting speeds cannot be obtained without chatter in the predetermined maximum number of attempts.

BRIEF DESCRIPTION OF THE DRAWINGS

A preferred embodiment of the method of this invention and apparatus for use in its practice are illustrated in the attached drawings in which.

DESCRIPTION OF PREFERRED EMBODIMENT

Figure 1:
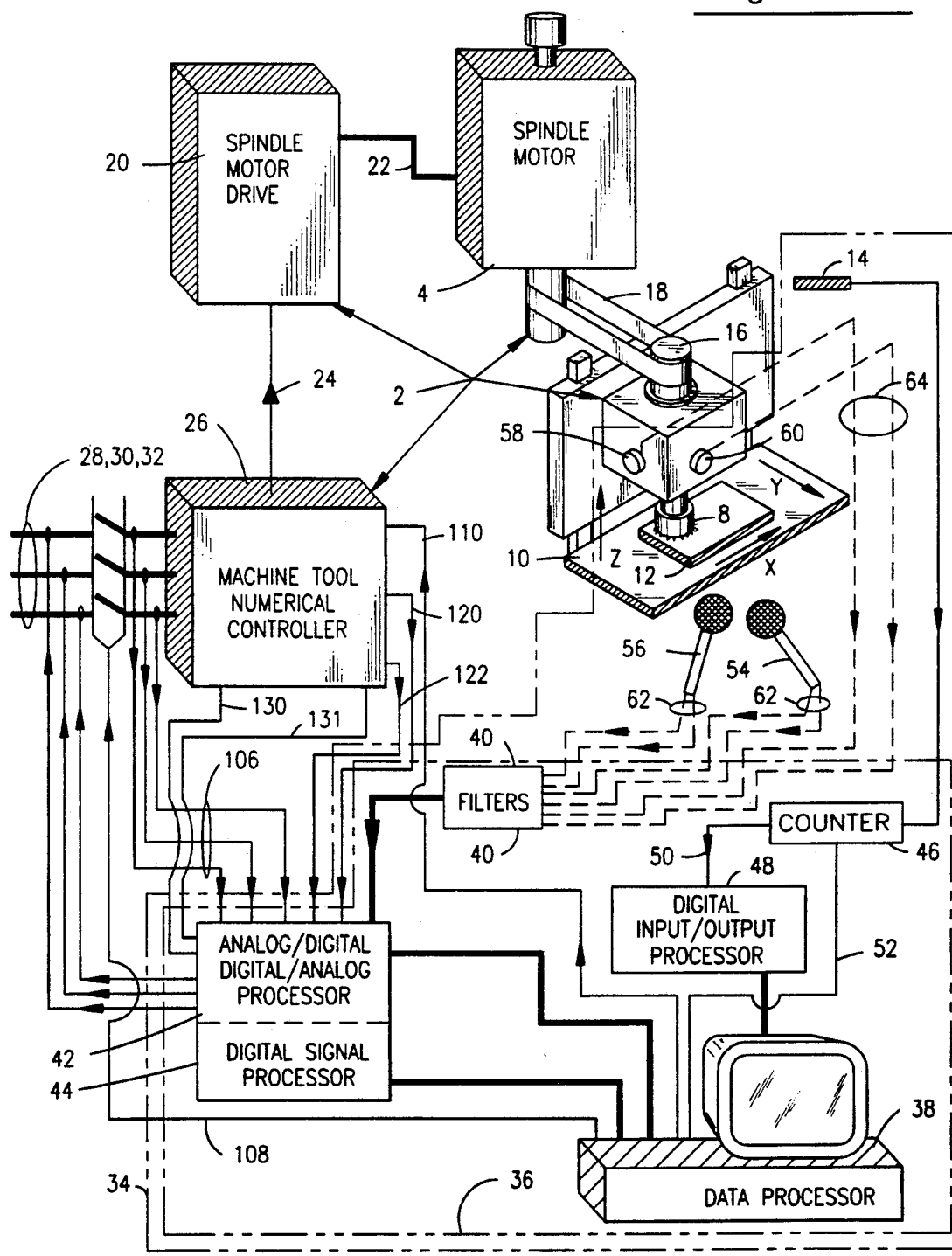
FIG. 1 is a schematic representation of the overall control system hardware and its interface with a typical configuration of a machine tool.

A preferred embodiment of the implementation of the method of the present invention is illustrated in FIG. 1. For the purposes of this illustration the machine tool 2 may conveniently be a three axis milling machine including a variable speed spindle motor 4, a milling head 6 servo controlled to move in the vertical or Z direction and having a rotating chip cutting tool 8 attached to the lower end of the rotating spindle and further including a movable table 10 for carrying a workpiece 12, with that table 10 being movable in orthogonal X and Y directions under the control of servo drives. The machine tool preferably also includes a speed pickup 14 for measuring the rotational speed of the spindle 16. In the embodiment illustrated the spindle drive motor 4 is connected to the spindle 16 by a suitable drive belt 18, although direct drive or other drive arrangements may be equally satisfactory. The spindle motor 4 is controlled by a conventional spindle motor drive 20 through deliberate and controlled motor current and voltage alterations, indicated by the connection 22 between the spindle motor drive and the spindle motor. These alterations 22 are generated by the spindle motor drive 20 as a result of motor drive command signals 24 issued by a machine tool numerical controller 26. This controller, which may suitably be a General Electric Mark Century 2000 NC controller, also generates servo signals indicated by the arrows 28, 30 and 32 that are issued to servos that manipulate the relative position of the spindle 16 and its cutting tool 8 along the axes of the three axis milling machine. As indicated by the arrows shown on the table 10, the direction of movements of the three servo controls for the movement of the workpiece 12 relative to the cutter 8 are shown by the arrows X, Y and Z. As should be apparent, a comparable arrangement would apply to other types of metal cutting machine tools, including, without limitation, lathes, boring machines and others, possessing a powered spindle for either the workpiece or the cutter to provide for rotational movement of the cutter 8 relative to the workpiece 12.

The chatter recognition and control (CRAC) system of this invention is represented by the components incorporated within the outer broken line 34 of FIG. 1. In general, this CRAC system 34 is a collection of sensors and processing hardware controlled by an object code computer program residing in the system memory of a microcomputer or microcontroller. The processing and analysis components are grouped together as the chatter analyzer, comprising the components included within the inner broken line 36 on FIG. 1. The analyzer is operatively connected to both the sensors and the milling machine, with all inputs and outputs of the CRAC system and other signals from the sensors passing through the chatter analyzer 36. In this preferred embodiment of the CRAC system 34 it is configured either to be retrofitted to an existing machine tool or incorporated in the design of a new machine tool control system. Further, this system 34 does not necessarily interfere with standard machine tool operation, even when it is activated.

With further reference to FIG. 1, the chatter analyzer 36 includes a data processor 38, which may conveniently be a commercial microcomputer suitably using the Intel 80286 or 80386 microprocessors. The present invention has already been used in connection with an IBM PC-AT computer, suitably utilizing a commercial data acquisition circuit board, such as a Data Translation DT 2818 with its accompanying operating software. Alternatively, the data processor could be a dedicated microcontroller equipped with a display screen, keyboard interface, communication capability such as parallel and serial ports, and at least 256 kilobytes of nonvolatile memory storage. The analyzer also incorporates conventional filtering circuits 40 to limit the types of signals fed into the computer in the manner to be described in more detail below. The processor is also augmented by a conventional analog/digital-digital/analog (A/D-D/A) processor 42 connected to a digital signal processor (DSP) 44 to receive signals from the filter 40 and pass them on to the data processing computer 38. Both the analog/digital-digital/analog processor 42 and the digital signal processor 44 may be add-in boards or a combined single add-in board, such as are commercially available, conveniently mounted within the microcomputer 38.

A counter 46 is also provided to receive signals from the speed pick up 14 and process them in the manner to be described below before passing those signals on to the microcomputer 38. This counter may also be another add-in board, as may be the digital input/output (DIO) processor 48 that receives an output signal from the counter 46 and processes the signal before passing it on to the microcomputer 38. The counter 46 and DIO processor 48 conveniently may also be commercially available add-in boards for the microcomputer. The microcomputer 38, filters 40, A/D-D/A processor 42, digital signal processor 44, counter 46 and DIO processor 48, collectively, are defined as the chatter analyzer 36.

As shown in FIG. 1, the chatter analyzer 36 receives signals through the filters 40, which provide for limiting the signals to a predetermined frequency range (depending upon the application), through the use of conventional band pass filters in which the center frequency and the band width utilized are chosen based upon the application with respect to the machine tool and workpiece. These filters 40 condition the input signals received from several CRAC system sensors that will be described below and provide output signals to the A/D-D/A processor 42 for subsequent transmission to the microcomputer 38. The A/D-D/A processor 42 writes to or reads from the microcomputer 38 or the digital signal processor 48 and correspondingly converts the data to the appropriate digital or analog form. The counter 46, also a commercially available add-in board into the microcomputer 38, provides a means to count pulses or to determine pulse lengths from the speed pick-up 14, which conveniently might be an encoder or optical sensor, and make available to the microcomputer 38 a signal in digital format representing the spindle speed, which will be referred to as the digital speed signal and indicated by the line and arrow 50 on FIG. 1. The digital speed signal 50 is acquired by the DIO processor 48 when directed by the spindle speed ready signal, indicated by signal line 52, and is written to the data processor or microcomputer 38 work space. The speed pick-up 14 may, in this embodiment, conveniently be an analog device such as a tachogenerator that would provide a signal proportional to the spindle speed and read by data processor 38 by means of the analog to digital processor 42, thus eliminating the use of the digital input/output processor 48 in this embodiment. The components of the chatter analyzer 36 are all directed and controlled by an object program residing in the work space of the microcomputer 38. This chatter analyzer 36 monitors numerous signals, described below, which are processed by that chatter analyzer 36 with outputs being generated to control the spindle speed and table feed as a method of eliminating chatter during the machining of the workpiece.

The chatter recognition and control (CRAC) system 34 also includes a variety of sensors for detecting the presence of any such chatter. These sensors monitor vibration and rotational speed. In this preferred embodiment the primary vibration sensor consists of at least one audio pressure sensor, such as a common commercial electret microphone suitably having a nominal band width of about 100 Hz to 10 kHz. In this preferred embodiment two microphones 54 and 56 preferably are utilized, with each of those microphones positioned apart from one another with any directional sensitivity of the microphones being oriented toward the position of engagement between the cutting tool and workpiece. In place of the microphone other sensors, such as vibrational displacement, velocity or acceleration sensors, as well as others may be substituted for the microphones. Whichever sensors are utilized are designed and mounted in such a manner to allow the sensor or sensors to be in close proximity to the cutting operation to detect a chatter signal, but not being so close or so distant as to sufficiently distort the signal, as might be caused in the case of microphones by near field effects or reverberations or the like. The audio sensor 54 or sensors 54 and 56 generate audio signals, accessed initially by the analyzer through the filter with subsequent values being acquired by the A/D-D/A processor 42 and stored in the microcomputer 38 work space.

In this preferred embodiment the CRAC system 34 may also include secondary vibration sensors 58 and 60 for use in other situations that require more information about the cutting process than the primary vibration sensors or audio sensors 54 and 56 might provide. These secondary sensors 58 and 60 may suitably consist of either displacement sensors, acceleration sensors or velocity sensors mounted directly on the machine tool by conventional means that permit these sensors to be located as close to the cutting operation as possible. Signals from the secondary sensors 58 and 60 are acquired by means generally similar to those utilized with the primary sensors, including the filters 40, A/D-D/A processor 42, digital signal processor 44 and microcomputer 38. As shown in FIG. 1, the chatter analyzer 36 can utilize both the primary and secondary sensors if desired, processing all of their signals through the filters and other components as shown.

Figure 2:
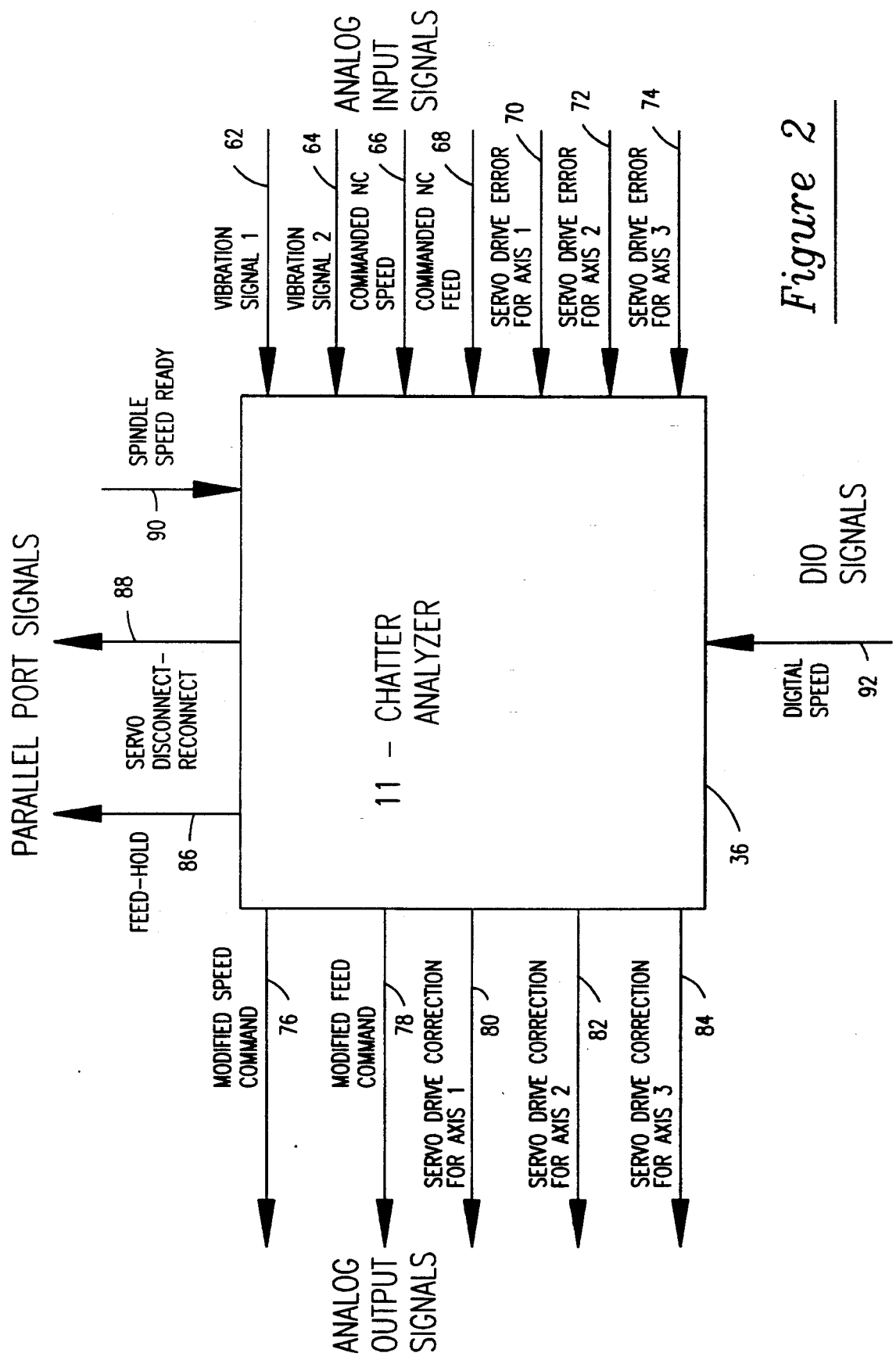
FIG. 2 is a schematic representation of the input and output signals of the chatter analyzer of the apparatus for practicing the invention.

In FIG. 2 the various signals received and generated by the chatter analyzer are illustrated. The signals shown in FIG. 2 are also illustrated in FIG. 1. The signals include a set of analog inputs, shown on the right side of the chatter analyzer box 36, collected by the A/D-D/A processor 42, a set of analog output signals, shown on the left side of the chatter analyzer box, that are output by the A/D-D/A processor 42, a digital input signal, shown below the box, from the digital input-output (DIO) processor 48 and a set of high-low signals, shown at the top of the box, output or read by the data processor or microcomputer 38.

In the diagram of FIG. 2 the possible set of analog input signals that are sampled by the A/D-D/A processor 42 include two vibration signals and signals from three servo axes. The number of input signals may be increased or decreased, depending upon the specific application. The vibration signals 62 and 64, shown at the upper left side of the chatter analyzer box, are each acquired at a rate suitable for the specific system application and generally at a rate of not less than 4,000 times per second. These signals 62 and 64 are acquired simultaneously and originate from the primary sensors 54 and 56 and, possibly, the secondary sensors 58 and 60. The signals are conditioned by the filters 40 prior to sampling, to provide to the data processor 38 signals of the desired band width and relevant amplitude. The number of the vibration signals 62 and 64 sampled are limited by the speed and work space storage capability of the chatter analyzer 36.

The next set of input signals originate from the machine tool numerical controller 26 and include a commanded numerical control speed signal 66 and a commanded numerical control feed signal 68, which are sampled separately and generally at a significantly lower rate, as determined for each application, than are the primary vibration signals. These numerical controller signals 66 and 68 are acquired by the chatter analyzer 36 only to be returned to the numerical controller as output signals, as described below, from the chatter analyzer 36 after they have been processed and modified. This is performed by means of a simple splice at the location in the controller 26 where the commanded speed 66 and feed 68 signals are produced. The splice is located along a signal path that contains the commands 66 and 68 prior to any action by the controller and just after the command initiation by the numerical controller 26. The servo drive error signals for axes 1, 2 and 3 are shown as signals 70, 72 and 74, respectively. These signals are values acquired from the servo signals 28, 30 and 32 after issuance from the controller 26. The number of the servo signals is dependent upon the number of axes to be controlled, which conveniently may be three, as in the illustrated example.

The analog output signals shown on the left side of the chatter analyzer box 36 of FIG. 2 are generated by the A/D-D/A processor as a result of commands formulated by the object program, described below, that resides in the data processor 38. The modified speed command 76 and modified feed command 78 are output to replace the command signals 66 and 68 received by the chatter analyzer. During passive operation in which the chatter analyzer is not active, the modified signals 76 and 78 are not changed by the chatter analyzer 36 and are equivalent to the input signals 66 and 68. Additional analog output signals are the servo drive correction signals 80, 82 and 84 for the servos of axes 1, 2 and 3, which correspond to the X, Y and Z axes described above. These correction signals are output and maintained by a structure described below.

Additional signals input or output of the chatter analyzer 36 are high-low or low-high transition signals indicating or commanding actions. The feed hold signal 86 toggles the machine tool numerical controller 26 to issue a feed-hold or to release a feed-hold command depending on its current state. This signal acts according to the existing logic of the numerical controller. If desired, there may be provided an additional circuit, including a relay, to amplify or reduce and isolate the necessary voltages for interrupting or reestablishing the feed. The servo disconnect-reconnect signal 88 toggles a relay that interrupts or restarts servo operation, depending on its current state. Such a relay would be added to the servo signals 28, 30 and 32 between the numerical controller and the servos controlling the machine tool. The spindle ready signal 90 acknowledges to the chatter analyzer 36 that it may write into the analyzer work space the digital speed signal 92 that represents actual spindle speed on the machine tool, as acquired by the DIO processor 48.

Figure 3:
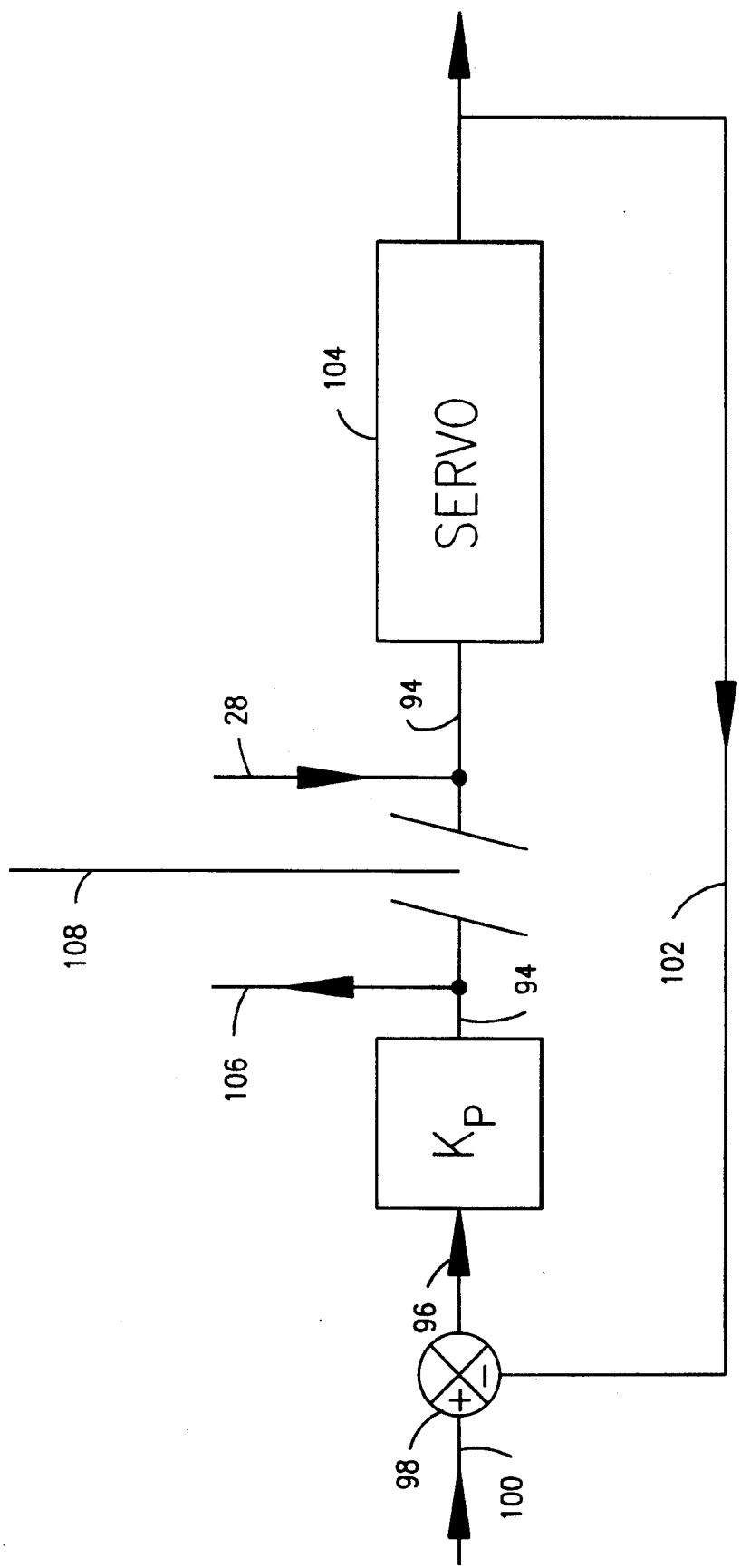
FIG. 3 is a block diagram illustrating the servo interrupt method practiced in the invention.

The structure employed to provide for rapid interruption of the feed of the workpiece relative to the cutter provides for direct interfacing with the servo control loop at the location of the commanded velocity signal 94, as schematically illustrated in the simplified servo control loop of FIG. 3. The machine tool numerical controller 26 (FIG. 1) determines the positional error of signal 96 received from the discriminator 98 as a function of the commanded position signal 100 generated by the controller 26 and the actual position signal 102, which is feedback from the servo 104. After the error value is converted to a commanded velocity signal 94, by means of the gain constant $K_p$, it is acquired by the chatter analyzer 36 and designated the servo drive error signals 106. These error signals 106 are acquired only after the analyzer 36 detected chatter and commanded a servo disconnect/reconnect signal 108 and simultaneously commanded a feed-hold signal 110 (FIG. 1). This enables a halt of approximately 10 milliseconds and excludes the machine tool numerical controller 26 from the feed-halt process, which typically would require 50 ms-200 ms of additional time to halt the feed. Such a delay could result in substantial damage to the workpiece or the cutting tool that is experiencing the chatter. Once feed is halted, the slow response of the controller 26 in issuing the feed-hold produces an unacceptable error that is accumulated by the discriminator 98, which prohibits an immediate reconnect of the servo 104 once the analyzer is ready to permit cutting. To properly reconnect the servo, the chatter analyzer 36 outputs a supplemental low velocity command, to be called the servo drive correction signals 28, 30 and 32, which are maintained until the servo drive error signals 106 are reduced to zero. Alternatively, the error can be removed through the action of the machine tool numerical controller 26. The servo disconnect/reconnect signal 108 is then issued simultaneously while eliminating the feed-hold signal 110. The normal delay of the controller 36 to release the feed-hold, after issuance of the feed-hold release signal, compared to the servo 104 reconnect time, causes no error to be generated during reconnection of the servo 104. As a result, no additional error is accumulated in the discriminator 98, and the servo 104 is reconnected smoothly and without incident.

A detailed description of the CRAC system 34 operation may be explained in connection with FIGS. 1-3 and the flow chart of FIGS. 4-6. In this preferred embodiment, the description applies to a configuration utilizing separate A/D-D/A processor 42 and digital signal processor 44 add-in boards in the data processor 38. Changes necessary for other configurations are readily apparent and well known to those skilled in the art. Two independent object programs operate within the chatter analyzer 36. The control program object code (FIG. 4) resides in the work space of the data processor 38. This program controls the data acquisition, output and general operation of the CRAC system 34. The chatter recognition program object code resides in the digital signal processor 44 work space and executes simultaneously with the control program object code. This object code is initially located in the data processor 38 work space but is loaded into the digital signal processor 44 work space during system initialization.

Figure 4A:
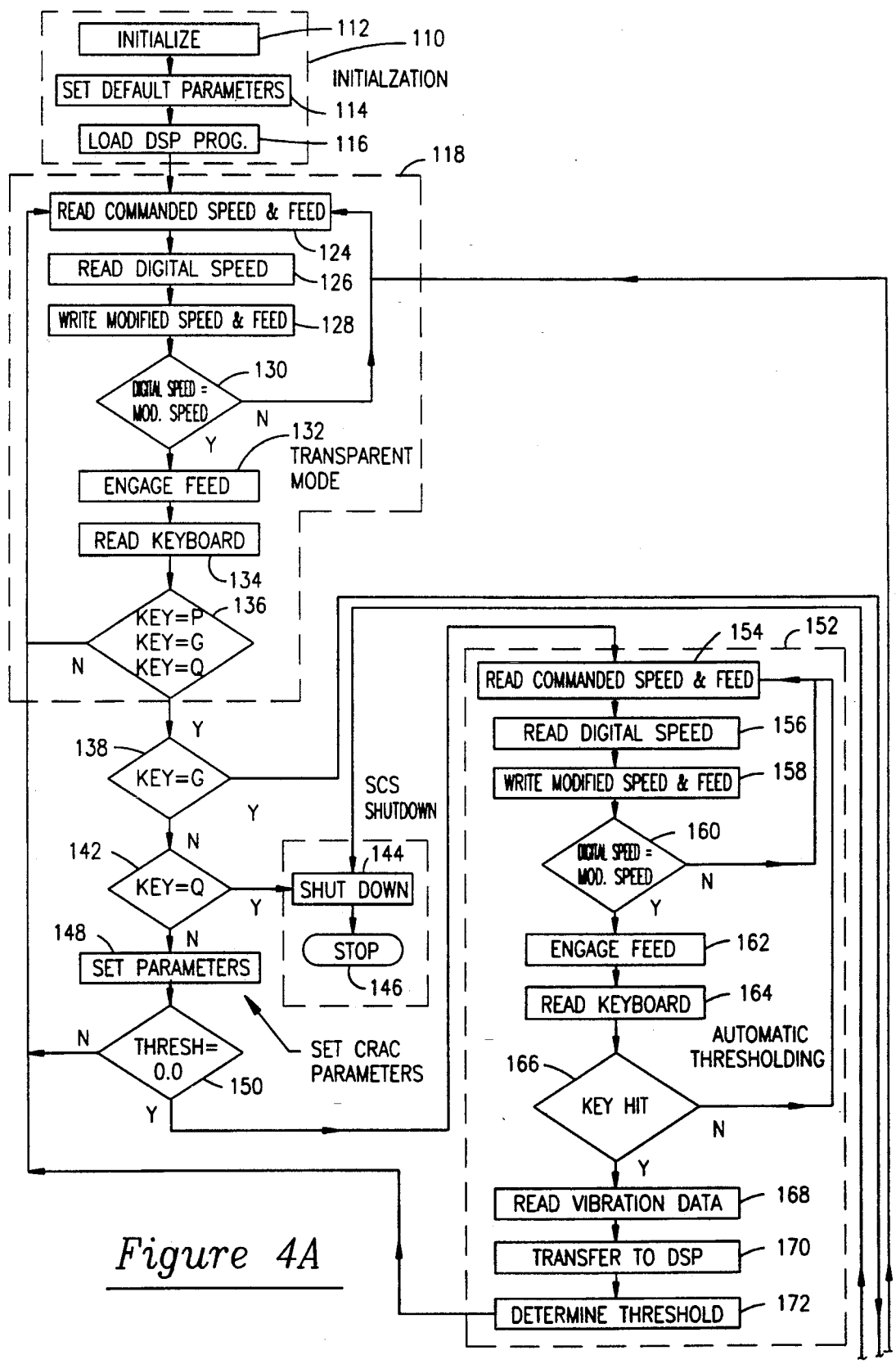
FIGS. 4A and 4B are detailed flow charts of the control program utilized in connection with this invention.
Figure 4B:
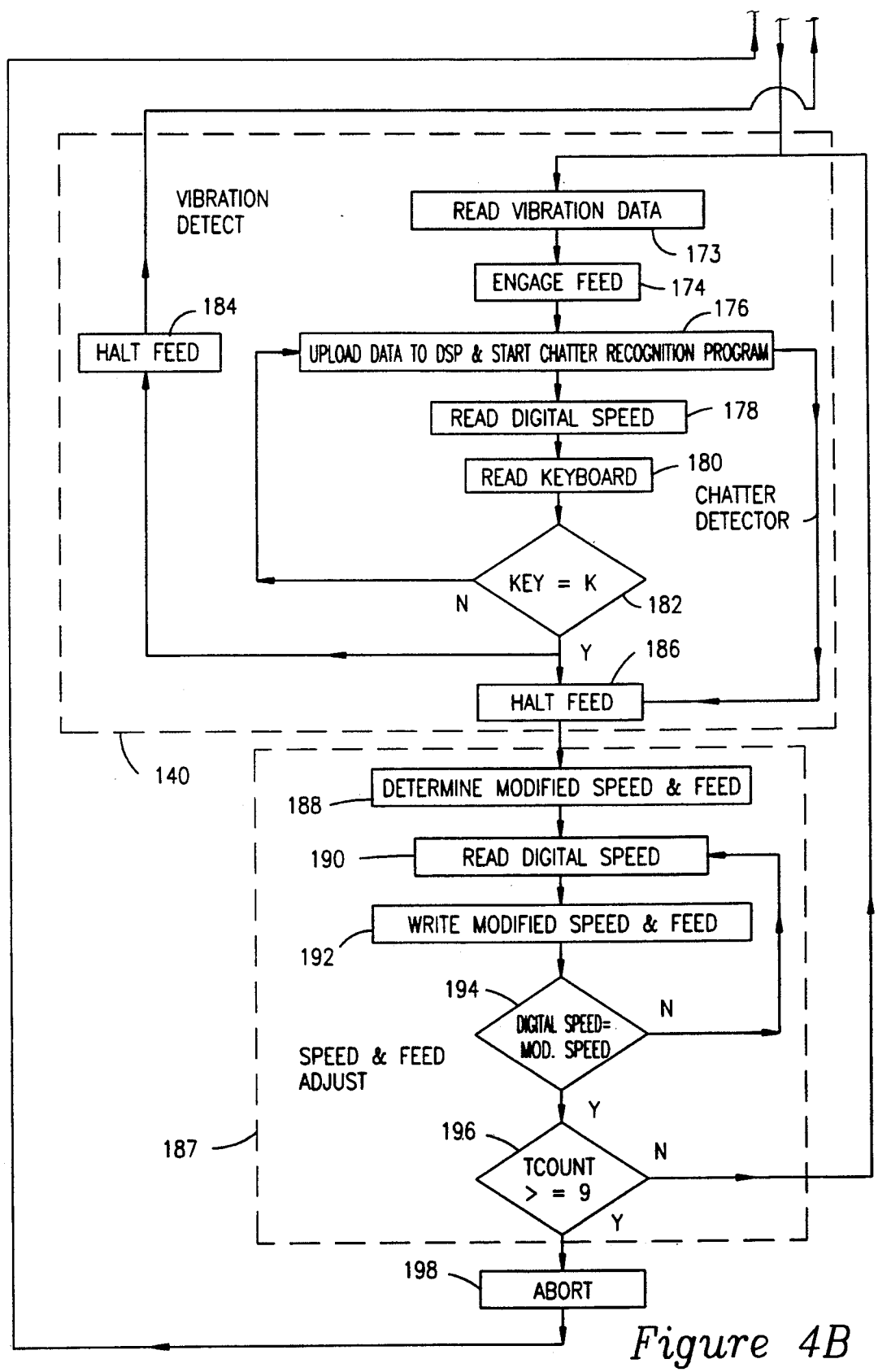

FIG. 4 is an overall flow chart of the control program object code. The execution of this code begins with the initialization 110 of the system. The CRAC system 34 is initialized as shown in box 112, and error checks of all system components are performed, and necessary functions, such as the clock of the data processor, disabled, and hand shakes are made to begin communication with the peripheral components, such as the A/D-D/A processor 42, digital signal processor 44 and the others. Default parameters are set as shown in box 114 to be subsequently used in the rest of the code, such as the rate at which the A/D-D/A processor 42 is to operate when gathering data. Finally, the initialization segment 110 ends when the chatter recognition program object code is loaded, as shown in box 114, from the data processor 38 work space to the digital signal processor 44 work space and executed.

The next module 118 of the control program object code permits the CRAC system 34 to operate transparently to the machine tool, such as the milling machine 2, and is thus designated the transparent mode module 118. The commanded numerical controller speed signal 120 and the commanded numerical control feed signal 122 (FIG. 1) are acquired by the A/D-D/A processor 42 and stored in the processor work space, as indicated in block 124 of FIG. 4. Next, the digital input-output processor 48 obtains the actual spindle digital speed signal 50 originating from the speed pickup 14, as indicated in block 126, and stores this signal in its work space. The commanded speed and feed commands 120 and 122, as well as the related depth of cut setting, are copied into the storage locations of the modified speed and feed command and are subsequently output, as indicated by block 128, through the A/D-D/A processor. This rotational speed signal is processed, as described below, to obtain a suitable rotational signal therefrom. This digital speed signal 50 and modified speed signals 130 are compared for similarity as indicated in block 130. Once these values match, the program is permitted to execute subsequent steps; otherwise, the commanded values of speed and feed signals 120 and 122 are acquired again, as indicated in block 124, and the program resumes execution of the blocks subsequent to block 124. Once the digital speed 50 and the modified speed command 130 match, the feed is engaged as shown in block 132, if necessary, by means set forth above. Values in the keyboard buffer of the data processor 38 are now acquired as indicated in block 134 and are checked for activation of one of several keys in block 136. If one of these keys has been entered, the code exits the transparent mode module 118.

Three different keys may be used to control the system initially. If a G keystroke is detected, as in block 138, the code proceeds directly to the vibration detecting module 140. If a Q keystroke is detected, the code executes a shut down as in block 42, which returns the system to a dormant mode and shuts down the spindle feed and speed by outputting zero values for the modified speed and feed command signals 130 and 131. This then shuts down the program as in block 144 and terminates the program as indicated by the stop block 146. If a P keystroke is detected, several parameters are requested, as indicated in block 148, by the code from the operator or from the machine tool numerical controller 26 work space. These parameters may include the number of cutter teeth, the cutter diameter, workpiece material, cutter material, possible threshold values and predetermined maximum and minimum speed and torque values for the machine tool. These parameters permit the chatter analyzer 36 to determine the limiting speeds and feeds. The threshold entered in the query of parameters, block 48, is tested in block 150 and, if a value other than zero is entered the system returns to the beginning block 124 of the transparent mode 118 module. Otherwise, a zero or null entry causes the code to determine automatically a threshold in the next module.

To provide for automatic determination of the threshold, an automatic thresholding procedure indicated by the collection of steps 152 is executed. A procedure, indicated by boxes 154–166, which is almost identical to the method in the transparent mode comprising boxes 124–136, is then executed to permit uninhibited preliminary operation of the machine tool while the threshold is being determined. The only difference is in the test of the key entry in box 166, which entry is acquired from the keyboard buffer of the data processor 38. Once any keystroke is detected, the vibration data, in the form of signals representative of relative vibrations between the machine tool and the workpiece, is acquired as in box 168 and loaded directly into the data processor 38 work space and then buffered to the digital signal processor 44 work space as indicated in box 170. This would occur even for a zero value for the threshold. The chatter recognition program object code is utilized to produce a new threshold value, as in box 172, and this threshold is continuously and repeatedly computed by the recognition code until a sufficiently reliable threshold value has been determined. The data processor 38 monitors the digital signal processor 48 work space and repeatedly downloads the threshold value to its own data processor work space when the data processor 38 detects a value in the digital signal processor 48 work space indicating completion of the recognition program cycle and continues this repetition until a valid and consistent threshold is obtained. The control program code then re-enters the transparent mode 118 procedure at its beginning by reading the commanded speed and feed rates a indicated in block 124.

When a G keystroke is detected as in block 138 of FIG. 4, the vibration detect mode 140 is executed. The vibration data is acquired, as indicated by box 173, at a continuous rate specified by the control program at a rate dependent upon the specific application of machine tool and workpiece but suitably not less than 4,000 times per second, and this continues until chatter is detected. In this vibration detect mode the workpiece feed procedure is engaged, as shown in box 174, and the control program begins to upload data periodically, as indicated in box 176, maintaining a data rate pace comparable to, but not less than, the acquisition rate. At this time the chatter recognition program set forth in the functional block diagram of FIG. 5, is started.

Figure 5:
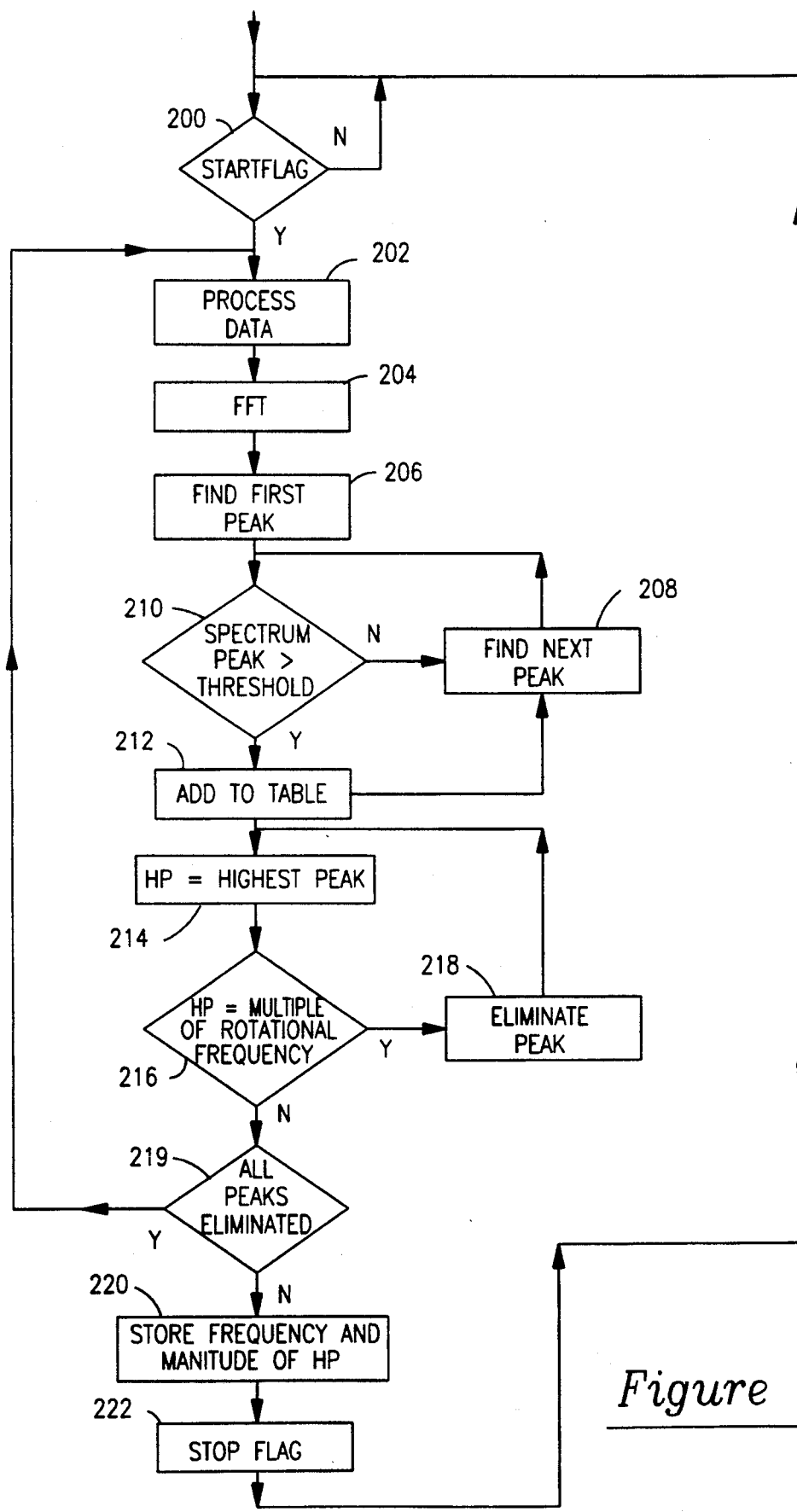
FIG. 5 is a detailed flow chart of the method of chatter detection contained within the object program residing in the digital signal processor memory.
Figure 6:
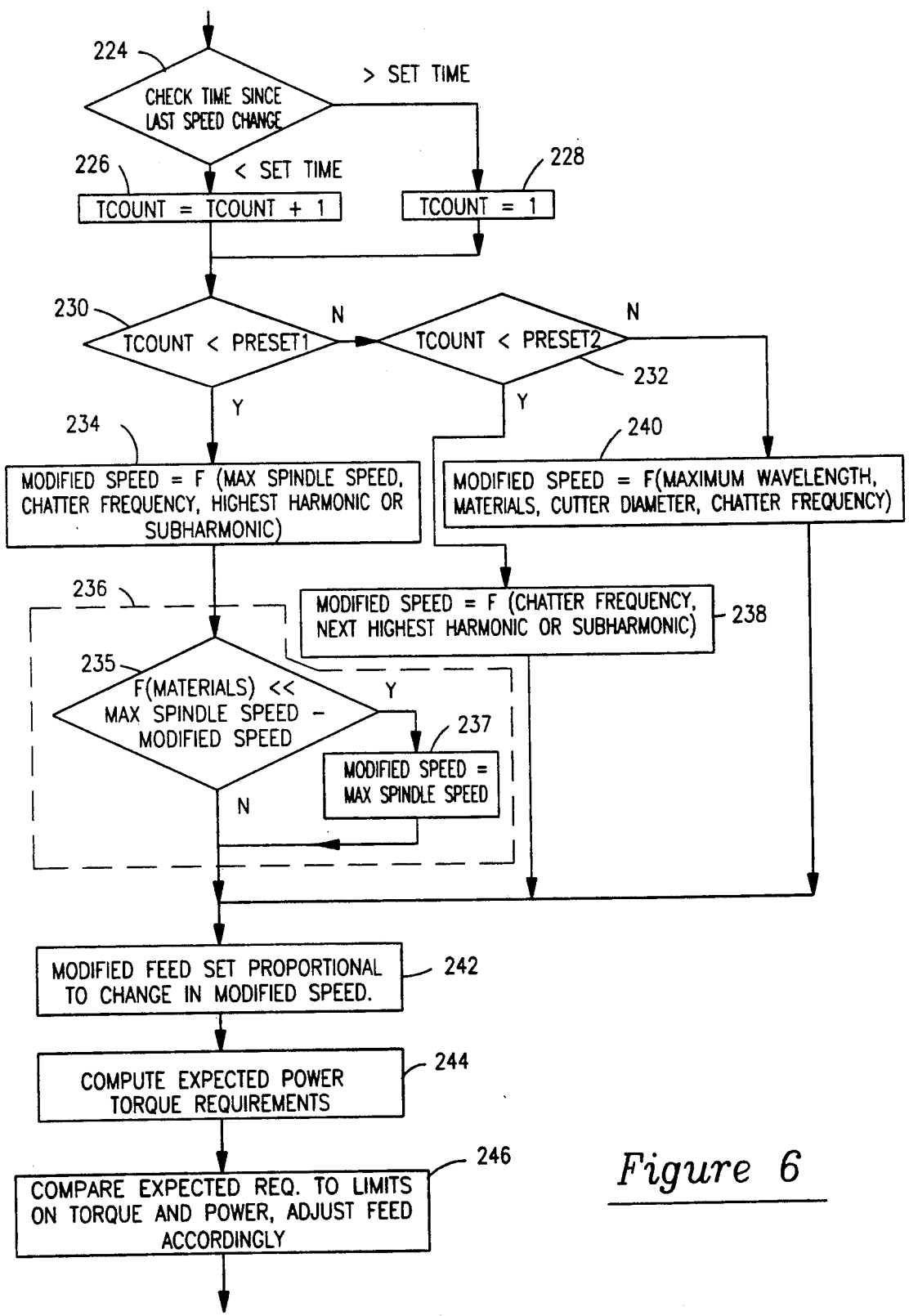
FIG. 6 is a flow chart illustrating the principal technique utilized to determine desirable speed changes of the machine tool.

FIG. 5 illustrates in block diagram form the object code program flow chart for the digital signal processor to execute the chatter recognition program. This program has been loaded into the digital signal processor 44 work space by segment 116 of the initialization module 110 of the control program. The necessary cutting parameters, such as the threshold and number of cutter teeth, have also been uploaded. This chatter recognition program is then started by the uploading of a start flag 200 to the digital signal processor 44 work space when the first packet of vibration data is initially uploaded. This permits the system to exit from a do-nothing loop and begin preparing the available data (block 202) in the digital signal processor 44 work space for computation by a conventional Fast Fourier Transform (FFT), suitably based on the well-known Cooley-Tukey algorithm or any of numerous other frequency transform algorithms, including the Winograd, Fast Hartley, radix and Wigner transforms, as well as others known to those skilled in the art. The spectral distribution of each signal is then produced by performing such an FFT procedure, as indicated by block 204. These spectra are searched for peaks, as in blocks 206 and 208, and each peak is tested to determine if it exceeds the threshold, as indicated in block 210. Each peak that exceeds the threshold is stored (block 212) in the work space. This procedure repeats, as indicated by block 208, until all of the spectra have been completely scanned. Next, the highest peak that is found to be emanating from the machine tool, determined by block 214, which is determined by means of processing multiple vibration spectra, is checked to see if it is a multiple of the predetermined spindle speed rotational frequency in block 216. If it is a multiple, then the peak is eliminated from the work space, as in block 218, and the procedure is repeated until the entire spectrum is checked or until a peak is found that is not a predetermined multiple of rotational frequency. In this latter case the system recognizes the existence of chatter. However, if the spectrum possesses no such peaks, as determined by block 219, the object code returns to processing data as in block 202, at which time new data has since been uploaded from the data processor 38 work space. If a peak is determined to have survived all of the foregoing tests, then the frequency and magnitude of the qualifying peak is written, by block 220, to the digital signal processor 44 work space and a stop flag is issued as indicated by block 222.

Returning the control program of FIG. 4, it may be seen that while the chatter recognition program of FIG. 5 is being executed, the control program continues to update the digital speed as in block 178 and to query the keyboard buffer for a termination flag (block 180), which it then tests to determine if a K keystroke has been issued by the keyboard. As shown in block 186, the halt-feed signal may be triggered either by the issuance of a stop flag of block 222 of the chatter recognition program of FIG. 5 or by obtaining a positive result from the keyboard inquiries to determine if a keystroke K has been issued. If a stop flag is issued, the program proceeds to the speed and feed adjustment module 187 to change the spindle speed and feed. Otherwise, the object code returns to the transparent mode module 118, with complete control being then returned to the numerical controller 26.

In this procedure spindle speed and feed adjustments are determined by a deliberate and distinctive technique. This determination is illustrated in FIG. 6, which shows a block diagram of the decision process involved in determining new speeds and feeds. Several consecutive changes may be necessary for proper stabilization of the machining process and a counter TCOUNT is embedded in the code for utilization in determining what specific approach might best be utilized. This counter is either incremented as in block 226 or reset as in block 228 depending upon the time between successive chatter occurrences or speed changes as measured in block 224. Each time that the chatter recognition program detects chatter, the time from the last detection and speed change is tested against a preset time in block 224, to determine if the cutting process has, in the meantime, achieved stability. If it has achieved stability, then the counter is reset (block 228) to indicate an initial corrective attempt. If the time since the last correction is less than expected, indicating that the process remains unstable, then the counter is incremented as in block 226.

After the counter has been incremented, four strategies indicated by blocks 234, 236, 238 and 240 are employed to correct the speed in successive attempts. These strategies are ranked in order of metal removal rate capability. The primary strategy 234 is attempted for the first set of speed corrections 230 in which the system generally permits at least two attempts, such that preset1 = 3. This primary strategy 234 may, in this embodiment, determine a new rotational speed according to the equation $n = 60(f/m(N+1)$ where n = new spindle speed (revolutions/minute), f = the frequency of the highest level of any chatter signal, m = the number of teeth on the cutting tool, and N = an integer such that n falls within the predetermined maximum and minimum rotational speeds for the given combination of the machine tool and the workpiece material. This strategy 234 selects a spindle speed as a function of chatter frequency. The spindle speed is selected such that the tooth frequency is equal to the chatter frequency or one of its subharmonics up to the fifth subharmonic of the chatter frequency. The maximum spindle speed produced, according to strategy 234, within the allowable spindle speed range, which has been entered along with other crucial cutting and machining parameters back in block 148 of FIG. 4, is the speed used for output of the modified speed command signal 130 in FIG. 1. An alternative strategy is attempted according to strategy 236, based on the modified spindle speed determined by strategy 234. If the spindle speed is substantially lower than the maximum allowable spindle speed, such as, for example, less than about 25–30% of that maximum allowable spindle speed, as determined by block 235, then the maximum allowable spindle speed is the speed used for output of the modified speed command signal 130 in FIG. 1, according to block 237. A look-up table, indexed by the data processor 38 work space according to workpiece and cutter material information, supplies the necessary value to be exceed by the difference produced by subtracting the modified speed determined by strategy 234 from the maximum allowable spindle speed. If these strategies 234 and 236 fail, then a second set of attempts, indicated by block 232 are made, utilizing the same rules as strategy 234 but selecting the next lower possible spindle speed as indicated in block 238. If both of these attempts fail after a predetermined number of attempts, a final strategy, indicated by block 240 is used to select spindle speed as a function of the limiting wavelength produced by chatter vibration and surface cutting velocity as computed by the outer diameter of the cutting circle relating to the specific cutting tool in use. A look-up table, indexed by the data processor 38 work space according to workpiece and cutter material information, supplies the maximum surface wavelengths to be permitted for an input set of materials. These are wavelengths that result from possible chatter vibrations and surface velocity. A maximum spindle speed is then generated that will limit the maximum length of the surface wavelength per the current chatter vibration value. The previous four strategies 234, 236, 238, and 240 discussed above, may be seen in FIG. 6 to produce the values for output as the modified speed command signals 130 (FIG. 1). Once the speed is determined, the modified feed command signal (131 in FIG. 1) is proportionally computed in block 242 preferably to permit an identical chip load that was present prior to the feed halt. The expected cutting torque and power is computed in block 244. If these values in block 244 exceed the predetermined permissible values, then the feed command signal 131 of FIG. 1 is reduced in block 246 to accommodate the restriction. The modified speed and feed values are then stored in the data processor 38 work space.

Returning to the main control program object code illustrated in FIG. 4, once modified speeds and feeds are determined in block 188, the digital speed signal 50 is acquired as indicated in block 190 and the values of the modified speed and feeds are output through block 192 through the A/D-D/A processor 42. The modified speed command 130 and the digital speed signal 50 are compared in block 194 repeatedly until the modified speed signal 130 and the digital speed signal 50 agree. On the first corrective attempt, in which TCOUNT = 1, the code returns to the vibration detection module 140 shown in FIG. 4. At that point either the cut has become stable or is still chattering. If it is still chattering, a new regulation process is started. The object code follows the previously explained methods. Again, the modified speed and feed values 130 and 131 are generated and output. The entire procedure continues until a stable speed is found or until a predetermined number of consecutive attempts have been made. A final test shown in block 196 is performed to arbitrarily restrict the number of successive corrections in which no stability has been achieved, as indicated by the time between speed change test of block 224, has been attempted. In this embodiment the number of successive corrections permitted is shown as being 9. If too many corrections are made, the system notifies the controller or machinist and aborts the object code, as in block 198 of FIG. 4, by returning to the shut down procedure of blocks 144 and 146. This shut down procedure, as previously indicated, outputs zero values for the modified speed and feed commands 130 and 131, effectively halting the machine tool so that the object code terminates, as indicated by the stop command of block 146.

To summarize the general functioning of the chatter recognition and control system, the following illustrates the steps of one complete operational cycle for a case of chatter detection. In this cycle the chatter recognition and control system 134 is initialized with the necessary error checks and hand shakes, and work spaces are allocated with predetermined default values set and the various object codes loaded into the appropriate memories and work spaces. The chatter analyzer 36 operates transparently, sampling and outputting numerical control commands 120 and 122 unmodified. Then the machinist operating the system flags the chatter analyzer by pressing the appropriate key to start supervision. At that point tooling, material and machine specific information, such as maximum and minimum feed, maximum power and torque, is accessed from a data base that conveniently is located in the data processor 38 or in the machine tool numerical controller 26, or by direct input of this information by the machinist. The chatter analyzer 36 then determines the maximum feeds and speeds appropriate for this combination of machine tool and workpiece. Subsequently, the machinist manually inputs threshold values or flags the chatter analyzer by entering a zero threshold and striking a keyboard key when ready, to sample background vibration signals and to determine a threshold. At that point, the start of the control cycle with operational cutting engagement between the cutting tool and the workpiece, monitoring of the vibration sensor signals and the numerical controller parameters begins. The control program (FIG. 4) periodically uploads new vibration data and digital speed data 50 to the digital signal processor 44 where the chatter recognition program is executing. This digital signal processor 44 produces spectra of the vibration signals as rapidly as possible. These spectra are filtered using threshold values and rotational speed. This monitoring continues until spectral components arise in the filtered spectra that exceed the threshold value. The chatter recognition program then halts after writing to its work space a stop flag and the value of the frequency of the filtered spectral line with the highest magnitude. The data processor 38 recognizes the stop flag in the work space of the digital signal processor 44 and issues a feed halt by simultaneously issuing a servo disconnect-reconnect signal 108 and a feed hold signal 110 through the output port. With the feed of the machine tool temporarily halted, the chatter analyzer modifies rotational speed and feed based upon the spectral line value downloaded from the work space of the digital signal processor 44 on material and tool information and machine specific data previously entered. With this data a modified speed 130 is output while the feed remains halted until actual rotational speed reaches the modified output speed. At that point the data processor 38 then uploads a start flag to the digital signal processor work space, which causes the chatter recognition program to restart. Feed is then restarted by first eliminating accumulated error in the servos and then by outputting a servo disconnect-reconnect toggle signal 108 simultaneously while eliminating the feed hold signal 110. Monitoring of the vibration signals and numerical control parameters resume simultaneously with elimination of the accumulated servo error. The control program object code then returns to "start of control cycle" and the cycles are repeated unless a predetermined number of attempts have been made without success to eliminate the instability, or, unless cutting process stability is achieved through proper speed and feed modifications, or until the machinist flags the chatter analyzer to return to transparent operation.

While the foregoing describes a particularly preferred embodiment of the method and apparatus for practicing the method of this invention, conveniently illustrated through the use of a milling machine, it is to be understood that numerous variations and modifications of this method and apparatus and applications to various other types of machine tools and workpieces will readily occur to those skilled in the art. Accordingly, all of these variations and modifications are to be deemed included within the scope of this invention, which is to be limited solely by the claims appended hereto.

What is claimed Is:

1. A method of controlling chatter in a chip cutting machine tool cutting at a predetermined depth on a workpiece and in which the speed of rotation of the cutting tool relative to the workpiece and the rate of feed of the cutting tool relative to the workpiece are both adjustably controllable between predetermined minimum and maximum rates for the particular combination of machine tool and workpiece material, said method comprising the steps of a) using a vibration sensor to detect signal levels representative of relative vibrations between said machine tool and said workpiece and generated by a preliminary operation of said machine tool at predetermined conditions of cutting depth, rotational speed and rate of feed;

b) processing said generated signals to obtain measurements of said signal levels generated by said preliminary operation as a function of signal frequency;

c) obtaining a signal indicative of said rotational speed during said preliminary operation and determining the rotational frequency therefrom;

d) determining a threshold of said signal levels such that said signal levels above said threshold for predetermined frequencies that exclude harmonics of said predetermined rotational frequency are indicative of chatter vibrations between said cutting tool and said workpiece;

e) operating said machine tool at a predetermined said speed of rotation and a predetermined said feed rate with respect to said workpiece and detecting said signal levels operationally generated by operational cutting engagement between said cutting tool and said workpiece;

f) if said operationally generated chatter signal levels exceed said threshold, then (1) interrupting said feed of said cutting tool relative to said workpiece and (2) changing said speed of rotation to an adjusted said speed of rotation so that said rotational frequency becomes generally equal to one of a predetermined set of subharmonics of the frequency of the highest said generated chatter signal level unless said speed of rotation is found to be substantially below said maximum rotational speed in which case said speed of rotation is changed to said maximum rate of speed of rotation, and then (3) resuming said feed and said cutting engagement with said workpiece and operating said machine tool at said adjusted speed of rotation;

g) repeating steps e) and f) until operation of said machine tool is obtained without said operationally generated chatter signal levels exceeding said threshold, up to a predetermined maximum number of said repetitions, and, if said operationally generated chatter signal levels exceed said threshold after said predetermined maximum number of repetitions has been made, then reducing said speed of rotation and said rate of feed to predetermined maximum levels known to avoid said generation of said chatter signal levels in excess of said threshold, whereby chatter-free cutting of the workpiece is sought at cutting rates greater than the speed known to avoid chatter but with reduction to that known speed if higher cutting speeds cannot be obtained without chatter in the predetermined maximum number of attempts.

2. The method of claim 1 wherein
said sensor is an audio sensor comprising at least one microphone, and
said step of detecting said signal levels comprises detecting sound pressure emanating from said chip cutting process.

3. The method of claim 2 wherein said audio sensor comprises two said microphones positioned apart from one another with said directional sensitivity oriented toward the position of engagement between said cutting tool and said workpiece.

4. The method of claim 2 wherein
said audio sensor comprises at least one microphone, and
said machine tool includes at least one secondary sensor for detecting vibration characteristics of said cutting tool relative to said workpiece.

5. The method of claim 4 wherein said secondary sensor comprises a sensor for detecting displacement of said cutting tool relative to said workpiece, whereby the displacement signals generated by the secondary sensor will provide additional signals regarding any chatter between the cutting tool and the workpiece.

6. The method of claim 4 wherein said secondary sensor comprises a sensor for detecting acceleration of said cutting tool relative to said workpiece, whereby signals indicating such acceleration will provide additional signals regarding any chatter between the cutting tool and the workpiece.

7. The method of claim 1 wherein said sensor comprises a vibration transducer, and wherein said step of detecting said signal levels comprises detecting signals of relative vibration between said cutting tool and said workpiece.

8. The method of claim 1 wherein
said machine tool includes an electrically operated servo loop for controlling said feed of said cutting tool relative to said workpiece, and
said step of interrupting said feed comprises directly opening said servo loop, whereby operation of the servo and thus of the feed is rapidly stopped.

9. The method of claim 8 wherein said feed interrupting step further comprises instructing said machine tool to halt said feed of said cutting tool relative to said workpiece.

10. The method of claim 1 wherein said rotational frequency is obtained from the signal of a tachogenerator attached to said machine tool.

11. The method of claim 1 wherein the said rotational frequency is obtained from the signal of a digital speedometer.

12. The method of claim 1 further comprising the steps, when said operationally generated signal exceeds said threshold and indicate chatter, of
performing said feed interrupting step,
processing said signals to determine the frequency for which the highest level of said chatter indicating signals occurs, and
performing said speed changing step to determine a new rotational speed according to the equation $n = 60f/m(N+1)$ where $n$=new spindle speed (rev/min), $f$=frequency of highest level of said chatter indicating signal, $m$=number of teeth on said cutting tool, and $N$=an integer such that $n$ falls within said predetermined maximum and minimum rates for said combination of said machine tool and said workpiece material, unless the value of $n$ found in this way is substantially lower than said predetermined maximum speed, in which case said new rotational speed is changed to said predetermined maximum rotational speed.

13. The method of claim 12 wherein said step of processing said signals comprises performing a fast Fourier transform analysis based on the Cooley-Tukey algorithm to obtain a spectral distribution of signal level as a function of frequency.

* * * * *